Jan. 14, 1964     O. G. KOPPIUS     3,118,080
TUNGSTEN DISPENSER CATHODES AND IMPREGNANTS THEREFOR
Filed Dec. 10, 1959     2 Sheets-Sheet 1
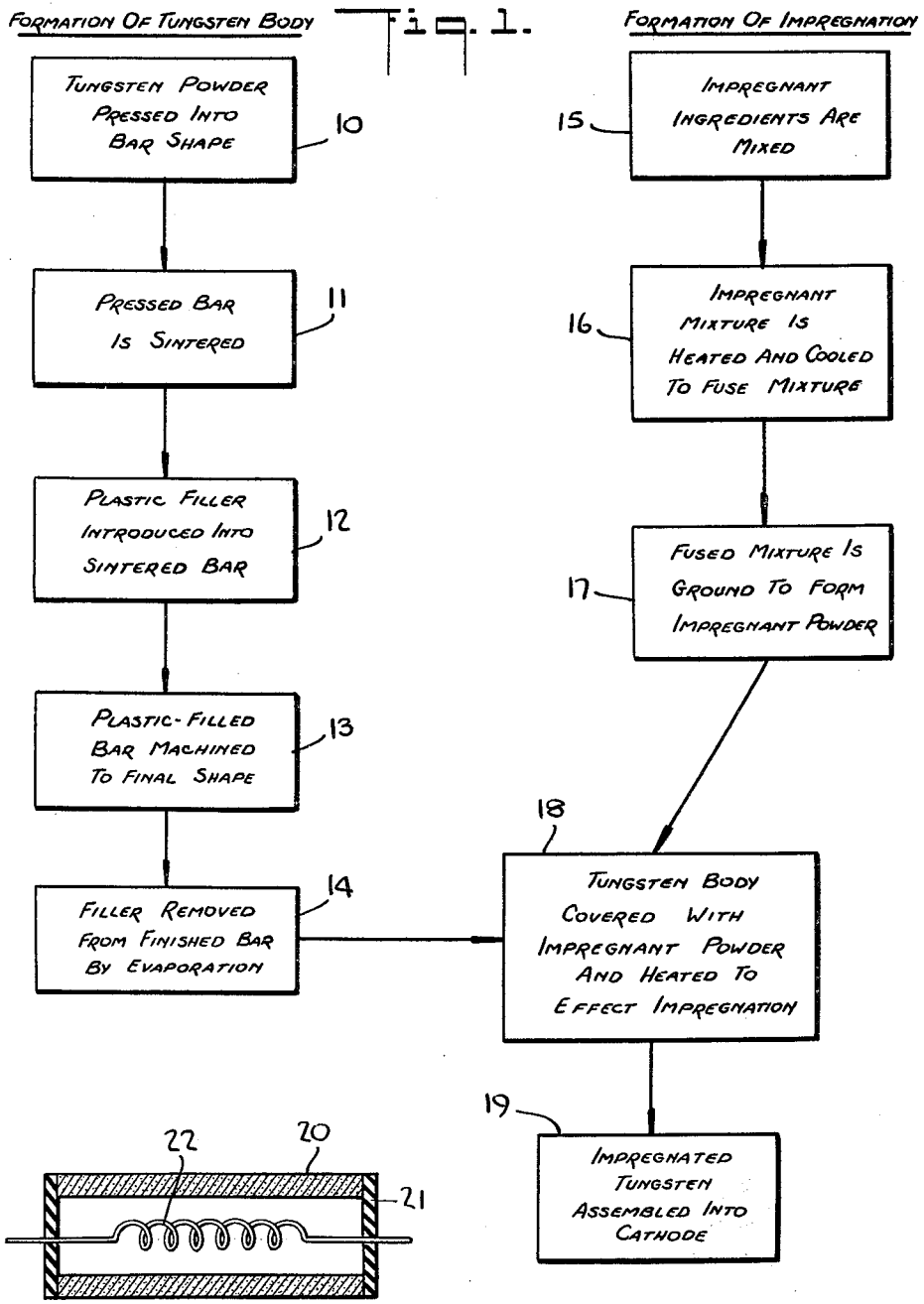
INVENTOR.
Otto G. Koppius
BY
ATTORNEYS INVENTOR.
Otto G. Koppius

United States Patent Office 3,118,080
Patented Jan. 14, 1964

3,118,080
TUNGSTEN DISPENSER CATHODES AND
IMPREGNANTS THEREFOR
Otto G. Koppius, Lexington, Ky., assignor to Semicon Associates, Inc., Lexington, Ky., a corporation of Kentucky
Filed Dec. 10, 1959, Ser. No. 858,799
15 Claims. (Cl. 313—337)

The present invention relates to tungsten dispenser cathode structures, to methods for fabricating such structures and to improved impregnants therefor.

Dispenser cathodes are known in which a porous tungsten body is impregnated with a supply of an alkaline earth composition capable of furnishing free alkaline earth metal to the cathode surface. In the U.S. Patents 2,700,000 and 2,813,807 there are disclosed dispenser cathodes in which a preformed porous body of refractory metal is impregnated from a melt with a fused mixture of barium oxide and one or more other metal oxides. During operation of the cathode, the mixture reacts with the tungsten to supply free barium to an emissive surface of the cathode.

Direct impregnation of porous tungsten with barium oxide alone is not satisfactory in that barium oxide has a very high melting point (1923° C.) and at that temperature it has such a high evaporation rate in vacuum that it is very difficult to impregnate the porous body from the melt. Moreover, since barium oxide tends to react rapidly with tungsten during impregnation, an inoperative or dead cathode may result, for little barium oxide remains to react with the refractory metal during cathode operation.

In order therefore effectively to introduce barium oxide into the pores of the tungsten body, it has heretofore been the practice to make use of a foreign element or carrier, such as an oxide selected from the group consisting of aluminum oxide, silicon dioxide, boric oxide, beryllium oxide, neodymium oxide, lanthanum oxide and praseodymium oxide. Such carrier compounds act as a diluent and fill up the pores of the tungsten. The carrier has the effect of increasing the apparent density of the porous tungsten, and thus a lower barium evaporation is observed.

In view of the foregoing, it is the main object of this invention to provide a tungsten dispenser cathode having an effective impregnant which is free of foreign elements or carrier constituents, thereby producing a cathode having superior operating characteristics.

More specifically, it is an object of this invention to provide a dispenser cathode having a porous tungsten body which is impregnated with a fused mixture of an alkaline earth metal oxide and a tungstate of an alkaline earth metal.

A significant advantage of the invention is that no new compounds are introduced into the porous tungsten except those which normally would be present as final end products of the reaction of alkaline metal oxides with tungsten.

Also an object of the invention is to provide an efficient and rapid method for fabricating improved cathodes of the above-described type.

In my copending application Serial No. 788,072, filed January 21, 1959, now Patent No. 3,076,916 there is disclosed a new technique for machining porous tungsten which makes use of a plastic filler rather than a metal filler. The prior use of metal fillers, such as copper, is disclosed for example in U.S. Patent No. 2,669,008. When using metal fillers it is virtually impossible to remove all traces of the filler, especially if the parts are large, whereas my plastic filler technique obviates all danger of contamination of the porous tungsten by a foreign metal.

Another feature of the present invention is that by introducing into a porous tungsten body of the type formed with a plastic filler, the new impregnants free of foreign carriers, the resultant structure has an emission level which is far greater than that achieved with prior art structures. Moreover, the barium evaporation rate can be better controlled if no carrier compounds are used to introduce the barium oxide into the porous tungsten.

For a better understanding of the invention, as well as other objects and further features thereof, reference is made to the following detailed description to be read in connection with the accompanying drawing, wherein:

FIG. 1 is a flow chart of the method of fabricating a cathode structure in accordance with the invention.

FIG. 2 is a sectional view of said cathode structure.

*Fabrication of Tungsten Body*

Figure 3:
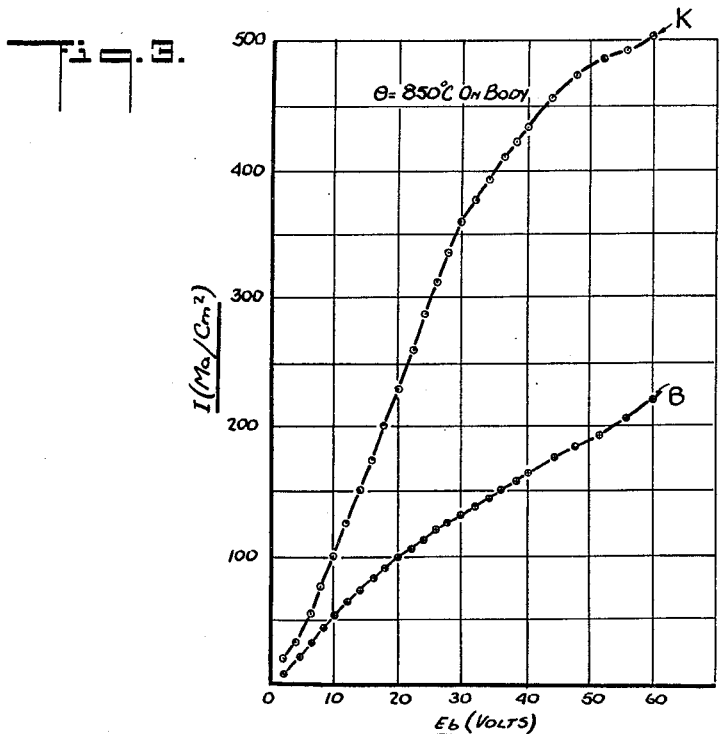
FIG. 3 is a graph illustrating the characteristics of the new cathode as compared to a standard cathode, under direct current operating conditions.

Each step in the method will be represented in a block in FIG. 1 of the drawing. Initially, in making a cathode in accordance with the invention, a porous tungsten bar or tube is formed by conventional metallurgical methods. Tungsten powder is pressed at 20,000 pounds per square inch pressure into a bar-shaped body 10. The body is then sintered at 11 in the manner disclosed for example in Levi Patent No. 2,669,008, but at a substantially lower temperature.

Instead of a copper filler, a plastic is used at 12 to impregnate the porous tungsten bar so as to facilitate machining, the plastic preferably being methyl methacrylate which is capable of polymerization and depolymerization without leaving foreign deposits. A more detailed description of suitable plastic fillers for this purpose and of the methods of introducing and removing such fillers may be found in my copending application Serial No. 788,072.

Once the sintered tungsten body at 13 has been machined to the desired dimensions, the plastic may be removed at 14 by heating at a relatively low temperature, as for example 1000° C. for five minutes in a vacuum furnace.

*Impregnation of Tungsten Body*

The porous tungsten body is impregnated with a fused mixture of an alkaline earth metal oxide and a tungstate of an alkaline earth metal, the alkaline earth metal oxide forming a substantial portion of the mixture. Specifically the mixture is constituted by barium oxide and at least one tungstate selected from the class of barium tungstate, strontium tungstate and calcium tungstate. The impregnant mixture may also be composed of barium oxide and a mixture of all of the tungstates above listed.

It is important that the mol ratio of barium oxide to the selected tungstate or mixture of tungstates should be at least 3/1 or greater. It has been found that mol ratios below 3/1, such as 2/1 and 1/1 are substantially non-emissive.

Mol ratios at 3/1 and above, such as 4/1, 5/1, etc., are satisfactory but above a ratio of 10/1 an excessive erosion of the porous tungsten parts is encountered on impregnation. The optimum ratio has been found to be about 5/1 of barium oxide to the alkaline tungstate. The alkaline tungstate can be any of the three tungstates above indicated (i.e., barium, calcium or strontium) or any combination thereof, provided that the mol ratio between the barium oxide and the tungstate is held within the specified limits.

The new impregnant mixture is preferably prepared in a semi-fused state to insure complete mixing and solution of the two compounds. One can start with either barium hydroxide or barium carbonate, the former being preferable. Strontium tungstate is the preferred alkaline tungstate. The correct amount of the two compounds according to the mol ratio of 5/1 are weighed out at 15 and mechanically mixed.

The entire amount of powder is placed in a tungsten boat at 16 and heated in a hydrogen furnace at a temperature of about 1000° C. until the fused mixture starts to boil and the impregnant is then allowed to cool in hydrogen to room temperature.

A small portion of the mixture in the semi-fused state is removed and ground to powder at 17 in a mortar and a sufficient amount of powder is made to cover completely the tungsten parts that are to be impregnated.

The porous tungsten parts to be impregnated are placed in a tungsten boat or on a tungsten sheet at 18, and after being covered with the impregnant powder, the parts are slowly heated in a hydrogen furnace to a temperature of about 1750° C., at which level the impregnant is fluid. An impregnation period of 15 to 30 seconds at this temperature is generally ample to fill completely the pores of the tungsten. The parts are allowed to cool in hydrogen to room temperature, they are cleaned of excess impregnant and are then assembled at 19 into a cathode structure.

A typical cathode structure, as shown in FIG. 2, comprises a sintered tungsten tube 20 impregnated with a mixture of strontium tungstate and barium oxide, the tube being closed at the ends by molybdenum caps 21. A heater filament 22 is coaxially extended through the lead-in wire for the filament passing through the caps. To prevent evaporation of material internally of the tube, the internal surface thereof may be lapped prior to impregnation to close the pores of its internal wall. It is to be understood that many other cathode forms may be used making use of the invention.

Cathodes of good quality can be made with porous tungsten within the density range of 60 to 88% of theoretical. The lower limit of 60% is set because cathodes made from porous tungsten below this limit exhibit excessive barium evaporation with a resultant shortened operating life. The upper limit of 88% is set by the machining technique, for it becomes impractical to machine parts above this density value.

The new impregnation technique operates most effectively within the density range of 80 to 86% of theoretical, for within this range the cathode emission level is substantially constant. The optimum tungsten density to attain both maximum emission and minimum barium evaporation has been found to lie between 84 to 86% of theoretical.

Figure 4:
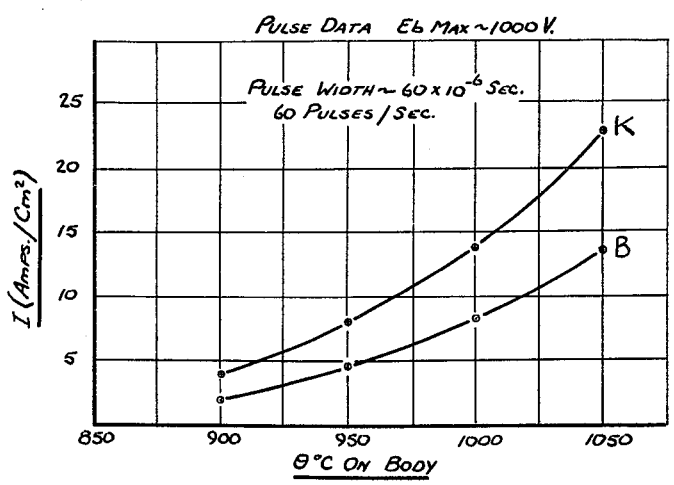
FIG. 4 is a graph illustrating the characteristics of the new cathode as compared to a standard cathode, under pulse operating conditions.

Two well known prior art impregnants which are used commercially are commonly identified as type A (a mol ratio of 5/2 barium oxide and aluminum oxide) and type B (a mol ratio of 5/3/2 of barium oxide, calcium oxide and aluminum oxide). Such known impregnants, as pointed out previously, include foreign carriers. In FIGS. 3 and 4, the characteristic curve of a standard cathode, marked B, is compared under D.-C. level conditions and pulse operation, with a cathode in accordance with the invention (5/1 mol ratio of barium oxide to strontium tungstate). It will be seen that the characteristic curve for the new cathode structure, marked K, has an emission level about a factor of two better than the prior type marked B.

It is desirable to utilize the highest possible density of porous tungsten compatible with good impregnation. The conventional metal filler technique for fabricating the tungsten body imposes a serious limitation on density, as one can never be certain that all fillter metal is removed. That is, below 83%, the filler metal can be removed with moderate success for very thin porous tungsten pieces. Densities above 83% can be used, but the filler metal is then never completely removed and consequently the apparent density is different and the impregnation is erratic and difficult.

However, with the plastic filler procedure, as disclosed herein, such limitations are absent and when the new impregnant is used in conjunction with porous tungsten prepared by the plastic method, one is able to control the barium evaporation within narrow limits. Furthermore, the dispenser cathodes so fabricated are much more uniform in their emission characteristics, from lot to lot in production operations.

A major advantage of the new impregnant in conjunction with the plastic procedure for preparing the porous tungsten is that it permits the fabrication of very large cathodes, such as are useful as thermionic heat converters of the type disclosed in the November 13, 1959, issue of "Electronics" magazine in the article entitled "Thermionic Heat Converters."

While there has been disclosed preferred embodiments of my invention, it is to be understood that many changes and modifications may be made therein without departing from the essential spirit of my invention as defined in the annexed claims.

What I claim is:

1. A method of fabricating a dispenser cathode comprising the steps of forming a porous body of sintered tungsten and impregnating the pores of said body with a mixture of an alkaline earth metal oxide and a tungstate of an alkaline earth metal.

2. A method of fabricating a dispenser cathode comprising the steps of forming a porous body of sintered tungsten and impregnating the pores of said body with a mixture of barium oxide and at least one tungstate selected from the class consisting of barium tungstate, strontium tungstate and calcium tungstate.

3. A method of fabricating a dispenser cathode comprising the steps of forming a porous body of sintered tungsten and impregnating the pores of said body with a mixture of barium oxide and at least one tungstate selected from the class consisting of barium tungstate, strontium tungstate and calcium tungstate, the mol ratio of barium oxide to the selected tungstate being at least 3 to 1.

4. A method of fabricating a dispenser cathode comprising the steps of compacting tungsten particles into a body, sintering the body to form a porous blank, introducing a filler plastic in fluid form into the pores of the blank, polymerizing the plastic fluid to provide a lubricated tungsten surface, machining the plastic-filled blanks to the desired shape and size, evaporating the filler plastic to clear the pores of the finished tungsten body, and impregnating the pores of the finished body with a mixture of an alkaline earth metal oxide and a tungstate of an alkaline earth metal.

5. The method, as set forth in claim 4, wherein the impregnant mixture is constituted by barium oxide and at least one tungstate selected from the class consisting of barium tungstate, strontium tungstate and calcium tungstate.

6. The method of impregnating a porous tungsten body to form an emissive cathode comprising the steps of mixing barium oxide particles with tungstate particles selected from the class consisting of barium tungstate, strontium tungstate and calcium tungstate, heating and cooling the mixed particles to form a fused mixture, grinding the fused mixture into a powder, covering the tungsten body with the powder and heating the covered body to melt the powder and to cause impregnation of said body.

7. The method of impregnating a porous tungsten body to form a cathode comprising the steps of mixing barium oxide particles with strontium tungstate particles in a mol ratio of about 5 to 1, heating and cooling the mixed particles to form a fused mixture, grinding the fused mixture into a powder, covering the tungsten body with the powder and heating the covered body to melt the powder and to cause impregnation of said body.

8. The method of impregnating a porous tungsten body to form an emissive cathode, comprising the steps of forming a fused mixture of an alkaline earth metal oxide and a tungstate of an alkaline earth metal, the alkaline earth metal oxide forming a substantial portion of the mixture, grinding the fused mixture into a powder, covering the body with the powder, and heating the powdered covered body to melt the powder and effect impregnation of the body.

9. A dispenser cathode comprising a porous body of sintered tungsten, the pores of said body being impregnated with a mixture consisting essentially of an alkaline earth metal oxide and a tungstate of an alkaline earth metal.

10. A dispenser cathode comprising a porous body of sintered tungsten, the pores of said body being impregnated with a mixture consisting essentially of barium oxide and at least one tungstate selected from the class consisting of barium tungstate, strontium tungstate and calcium tungstate.

11. A dispenser cathode comprising a porous body of sintered tungsten having a density in the range of 60 to 88% of theoretical, and an impregnant mixture in the pores of said body consisting essentially of barium oxide and at least one tungstate selected from the class consisting of barium tungstate, strontium tungstate and calcium tungstate, the mol ratio between the oxide and the tungstate being at least 3 to 1 and not exceeding 10 to 1.

12. A dispenser cathode comprising a porous tungsten body having a density in the range of 80 to 86% of theoretical and an impregnant mixture in the pores of said body consisting essentially of barium oxide and at least one tungstate selected from the class consisting of barium tungstate, strontium tungstate and calcium tungstate, the mol ratio between the oxide and the tungstate being at least 3 to 1 and not exceeding 10 to 1.

13. A dispenser cathode comprising a porous tungsten body and an impregnant in the pores of the body consisting essentially of a mixture of barium oxide and strontium tungstate.

14. A dispenser cathode as set forth in claim 13, wherein the mol ratio between the oxide and the tungstate is about 5 to 1.

15. A dispenser cathode as set forth in claim 13, wherein the density of the tungsten body is between 84 to 86% of theoretical.

References Cited in the file of this patent
UNITED STATES PATENTS

| | | |
|---|---|---|
| 944,139 | Jones | Dec. 21, 1909 |
| 1,993,187 | Spanner et al. | Mar. 5, 1935 |
| 2,173,259 | Lederer | Sept. 19, 1939 |
| 2,353,635 | Aicher | July 18, 1944 |
| 2,700,118 | Hughes et al. | Jan. 18, 1955 |
| 2,813,807 | Levi | Nov. 19, 1957 |